United States Patent
Mihaila et al.

(10) Patent No.: US 11,211,853 B2
(45) Date of Patent: Dec. 28, 2021

(54) ELECTROMAGNETIC MOTOR OR GENERATOR WITH TWO ROTORS, FOUR STATORS AND AN INTEGRATED COOLING SYSTEM

(71) Applicant: Whylot SAS, Cambes (FR)

(72) Inventors: Vasile Mihaila, Figeac (FR); Loic Mayeur, Saint Santin (FR); Romain Ravaud, Labastide-Murat (FR)

(73) Assignee: Whylot SAS, Cambes (FR)

( * ) Notice: Subject to any disclaimer, the term of this patent is extended or adjusted under 35 U.S.C. 154(b) by 18 days.

(21) Appl. No.: 16/769,180

(22) PCT Filed: Jan. 7, 2019

(86) PCT No.: PCT/IB2019/050097
§ 371 (c)(1),
(2) Date: Jun. 2, 2020

(87) PCT Pub. No.: WO2019/138308
PCT Pub. Date: Jul. 18, 2019

(65) Prior Publication Data
US 2021/0218322 A1      Jul. 15, 2021

(30) Foreign Application Priority Data
Jan. 9, 2018   (FR) ...................... 1800022

(51) Int. Cl.
*H02K 16/00*      (2006.01)
*H02K 5/20*       (2006.01)
(Continued)

(52) U.S. Cl.
CPC ............. *H02K 16/04* (2013.01); *H02K 1/182* (2013.01); *H02K 1/2793* (2013.01); *H02K 1/28* (2013.01);
(Continued)

(58) Field of Classification Search
CPC ...... H02K 16/04; H02K 1/182; H02K 1/2793; H02K 1/28; H02K 3/46; H02K 5/20;
(Continued)

(56) References Cited

U.S. PATENT DOCUMENTS

2006/0076846 A1   4/2006   Han
2007/0046124 A1*  3/2007   Aydin .................. H02K 1/2793
                                                310/156.37
(Continued)

FOREIGN PATENT DOCUMENTS

CN       107332374       11/2017
DE       10208564        9/2003
(Continued)

OTHER PUBLICATIONS

International Search Report dated Mar. 20, 2019 from IA PCT/IB2019/050097.

*Primary Examiner* — Thomas Truong
(74) *Attorney, Agent, or Firm* — Crockett & Crockett, PC; K. David Crockett, Esq.

(57) ABSTRACT

A permanent-magnet synchronous motor or generator with at least one rotor (2) and at least one stator (3, 8). The motor includes two rotors (2), four stators (3, 8) and a cooling system (7, 7a). The cooling system includes three cooling circuits (7, 7a), i.e. two outer circuits (7) which are each accommodated in a longitudinal outer wall of a casing (8), adjacent to an outermost stator (3, 8), for cooling said outermost stator (3, 8), and an intermediate circuit (7a) located between the two innermost stators (3, 8) in the motor for simultaneously cooling said two stators (3, 8), the central shaft (5) being common to the two rotors (2) which are connected to the central shaft (5) by mechanical means.

14 Claims, 5 Drawing Sheets

(51) Int. Cl.
*H02K 9/19* (2006.01)
*H02K 16/04* (2006.01)
*H02K 1/18* (2006.01)
*H02K 1/27* (2006.01)
*H02K 1/28* (2006.01)
*H02K 3/46* (2006.01)
*H02K 7/00* (2006.01)
*H02K 9/197* (2006.01)

(52) U.S. Cl.
CPC ................. *H02K 3/46* (2013.01); *H02K 5/20* (2013.01); *H02K 7/003* (2013.01); *H02K 9/197* (2013.01)

(58) Field of Classification Search
CPC .... H02K 7/003; H02K 9/197; H02K 2201/06; H02K 2203/12; H02K 16/00; H02K 1/30; H02K 9/19; H02K 11/33; H01F 1/08; H01F 7/0221
See application file for complete search history.

(56) References Cited

U.S. PATENT DOCUMENTS

| | | |
|---|---|---|
| 2010/0071972 A1 | 3/2010 | Lamperth et al. |
| 2014/0167708 A1 | 6/2014 | Ritchey |
| 2016/0226346 A1 | 8/2016 | Roberts |
| 2017/0187252 A1 | 6/2017 | Takahashi et al. |
| 2017/0237326 A1 | 8/2017 | Cicilia |

FOREIGN PATENT DOCUMENTS

| | | |
|---|---|---|
| DE | 102016204444 | 9/2016 |
| EP | 2773023 | 9/2014 |
| JP | H08242557 | 9/1996 |
| JP | 2005143268 | 6/2005 |
| JP | 2009142095 | 6/2009 |
| JP | 3168877 | 6/2011 |
| KR | 20140008518 | 1/2014 |

\* cited by examiner

ELECTROMAGNETIC MOTOR OR GENERATOR WITH TWO ROTORS, FOUR STATORS AND AN INTEGRATED COOLING SYSTEM

FIELD OF THE INVENTIONS

This invention relates to an electromagnetic motor or generator with two rotors and four stators and an integrated cooling system distributed to optimize the cooling of the motor or the generator.

BACKGROUND

This invention has an advantageous but not restrictive application in an electromagnetic motor that delivers high power with a high speed of rotation of the rotor, which is obtained as a result of the specific characteristics of the rotor according to this invention in interaction with the specific characteristics of the stator or stators. A motor or generator of this type can be used, for example, as an electromagnetic motor in a fully electric or hybrid automotive vehicle.

In high-speed applications it is necessary to have not only a compact system made possible by the reduction of the weight and size of the axial motor for optimal output but also very high mechanical strength of the rotating part, i.e. the rotor or the rotors, to improve the reliability of the system but also that of the stator or stators.

For an electromagnetic machine with radial flux the rotor comprises a cylindrical body, the entire periphery of which carries magnets.

The stator or each stator carry winding elements comprising a tooth that carries a coil, the tooth being framed on each of its sides by a notch, a wire made of a metallic material that is a good conductor being wound around the tooth to form the winding.

When the one or more series of windings are supplied with electricity the rotor, which is fastened to the output shaft of the motor, is subjected to a torque resulting from the magnetic field, the magnetic flux created being a radial flux for a machine with a radial flux.

For an electromagnetic machine with an axial flux, the rotor comprises a body in the form of a disk that has two circular faces connected by a thickness, the disc being delimited between an external collar and an internal periphery delimiting a space for a rotating shaft.

At least two permanent magnets are applied against at least one of the two circular faces of the body which is called the support face. For a rotor with a single air gap designed to be associated with one stator, a single circular surface of the body carries the magnets, while for a rotor with two air gaps with a respective stator, it is the two surfaces that carry the magnets.

The magnets are each held on the face or their respective face by holding means, an interval being left between the at least two magnets on the same face.

The stator or each stator carries the winding elements comprising a tooth carrying a winding, the tooth being framed on each of its sides by a notch, a wire made of a metallic material that is a good conductor being wound around the tooth to form each winding.

For example, US-A-2010/071972, which represents the closest prior art, describes a permanent-magnet synchronous electromagnetic motor or generator and with axial flux comprising at least one rotor and at least one stator with a housing. Each rotor comprises magnet structures that form magnetic poles, the magnet structures extending all the way around the at least one rotor mounted in a rotating fashion around a median shaft and each stator comprises windings.

The motor comprises two rotors, four stators and a cooling system comprising three circuits of a cooling fluid, with two external circuits housed respectively in a longitudinal external wall of the housing and being adjacent to an end stator to provide cooling for this associated end stator and an intermediate circuit located between the two innermost stators of the motor, which simultaneously performs a cooling of the two innermost stators. The median shaft is common to the two rotors, the two rotors being connected to the median shaft by mechanical means.

The magnets in the rotor or each rotor of this motor are large magnets. However, a large magnet is subject to losses as a result of greater Foucault currents, something that should be avoided. Moreover, the heat released by a large magnet is significant and necessitates appropriate cooling, which requires the use of an expensive and bulky cooling system.

A motor with two rotors and four stators is relatively compact and releases a large quantity of heat which must be evacuated from the interior of the housing of the motor that contains the rotors and stators.

Moreover, on account of the large magnets used for the rotor in this document, a rotor of this type dissipates a large amount of heat. This dissipation makes it impossible to use axial retention means in the form of composite cover discs and the dissipation of heat can have consequences on the integrity of the coating which results in accelerated aging of this coating as well as of the magnets.

The same considerations apply with respect to US-A-2014/167708 which describes a polyphase generator with multiple windings comprising a transmission shaft, at least first and second rotors mounted rigidly on the transmission shaft so that they rotate simultaneously and in synchronization with the rotation of the transmission shaft, and at least one stator held in a sandwich between the first and second rotors. The magnets described in this document are large magnets which exhibit the same disadvantages as described above.

The problem addressed by this invention is to design an electric motor or generator with axial flux or radial flux that can efficiently evacuate the heat produced during operation of the motor or generator.

SUMMARY

For this purpose, the present invention relates to a permanent-magnet synchronous electromagnetic motor or generator comprising at least one rotor and at least one stator with a housing, the at least one rotor comprising magnet structures forming magnetic poles, the magnet structures extending all the way around the at least one rotor mounted so that it rotates around a median shaft and the at least one stator comprising windings, characterized in that it comprises two rotors and four stators and a cooling system comprising three circuits of a cooling fluid, with two external circuits respectively housed in a longitudinal external wall of the housing and being adjacent to an end stator to provide cooling of this associated end stator and an intermediate circuit located between the two innermost stators on the motor simultaneously providing cooling of the two innermost stators, the median shaft being common to the two rotors, the two rotors being connected to the median shaft by mechanical means, each magnet structure being composed of a plurality of unitary magnets, axial cover discs of the magnet structures being located axially on each of two opposite axial faces of each rotor, the cover discs being made of composite material, the magnet structures being coated in an external composite layer defining the exterior contour of each of the rotors, the cover discs being coated in the external coating layer of composite material or located on one respective axial face of the external coating layer.

The technical effect achieved by the present invention is to achieve enhanced cooling inside the motor while not increasing its size. A second effect is to make possible a precise adjustment during the positioning of the two rotors on the median shaft.

The provision of a coating of the rotor on the median shaft is known. This measure is not satisfactory because it prevents a discharge of the heat generated by the rotor during its rotation and during the heating of the magnets. The applicant has found that mechanical means make possible an improved evacuation of the heat outside the housing.

An additional advantage of this invention is that it makes possible an adjustment of the position of each rotor with respect to the shaft. That was not possible with a coated rotor on the median shaft. However, if an adjustment of this type is sufficiently precise it can make it possible to reduce the detent torque. This can be accomplished by offsetting one rotor radially at an angle in relation to the other. Each of the magnet structures of a rotor is no longer axially aligned with a respective magnet structure of the other rotor. It has been determined that this achieves a major benefit with respect to the reduction of the detent torque.

Providing a single cooling circuit for the two intermediate stators and their associated rotor saves space and reduces costs compared to providing two separate cooling systems. It is possible to increase the size of the cooling conduits or the flow of the cooling fluid to guarantee efficient cooling in the innermost portion of the motor.

The result is synergy between the cooling system and the mechanical means of fastening the rotor on the median shaft. The mechanical means make it possible to simultaneously reduce the heat created in the interior of the motor and the detent torque, which makes it possible to simplify the cooling system by providing only a single intermediate cooling circuit or to reduce the size of the cooling circuit.

According to the invention, one or more large magnets are replaced by a plurality of small magnets. The result is the creation of magnetic flux by a multitude of small magnets, of which there can be at least 20 or even more than 100 per magnetic pole. A rotor of the prior art could comprise from 1 to 10 magnets while the present invention makes it possible to provide many more smaller magnets in each magnet structure.

There must be no confusion between a magnet structure, a rotor that can carry from 5 to 10 or even more magnets, for example, and unitary magnets, of which there are a significantly greater number, whereby a rotor can, for example, carry several hundred of them. These small unitary magnets according to the present invention can be inserted into the respective cells by a robot.

This makes it possible to obtain a rotor which, among other advantages, can rotate at high speed and does not contain any iron, which limits rotor losses.

According to the invention, it has been discovered that a plurality of unitary magnets gives a stronger magnet structure on the level of the overall flexure of the rotor while producing very little heat on account of the low losses generated, because the heat dissipated by the unitary magnets is less than the heat dissipated by one large magnet in one piece corresponding to them.

The magnet structure comprises a layer of nonconducting composite coating the unitary magnets, which are if necessary placed in a mesh structure. Moreover, it can have high mechanical strength and the coating can easily be applied by injection of the composite material over an arrangement of unitary magnets held in place in relation to one another by any means.

With the rotor of this type, it is advantageous to associate two stators comprising iron teeth with concentric windings, which is easy to carry out.

It is possible to use different types of materials for the unitary magnets, which can be selected, for example, from among the samarium-cobalt alloys (Sm—Co), alloys of aluminum, nickel and cobalt, hard ferrites and neodymium-iron-boron materials, the important thing being that these materials must be able to withstand being machined into blocks with a small width or small diameter compared to their length.

The intermediate circuit is advantageously housed in an intermediate wall of the housing extending radially with respect to the common medium shaft. The intermediate circuit is then integrated into the housing like the external circuits.

The intermediate wall advantageously comprises two portions that extend radially with respect to the common median shaft, each portion being fastened respectively to one of the two innermost stators on the motor by removable fastening means. This makes it possible to guarantee the solidity of the motor assembly by this radial element on the shaft which is part of the housing and is attached on one side to a first intermediate stator and on the other side to the second intermediate stator.

The magnet structures carried by one of the two rotors are advantageously radially offset by a predetermined angle with respect to the magnet structures carried by the other rotor, it being possible to precisely adjust the offset of the magnet structures of one rotor with respect to the other rotor during the assembly of the rotors on the median shaft.

This makes possible a reduction of the detent torque and can be achieved only if the positioning of one rotor with respect to the median shaft is precise and advantageously modifiable.

Advantageously, a binding band surrounds the external coating layer on its exterior periphery farthest from the median shaft.

Advantageously, the unitary magnets are constituted by elementary magnet blocks with a mesh structure, unitary magnets being bonded by a resin that separates them or each inserted into a respective housing defined by one of the meshes of the mesh structure.

The mesh structure, which is advantageously made of composite material, holds the unitary magnets in place, which contributes to the strength of the rotor. The rotor with magnets located in the cells according to the present invention is designed to reduce losses in the rotor with fastening means that make it possible to hold magnets and to reduce the effect of the axial or radial force and the centrifugal force at very high speed.

Compared to the prior art, the rotor according to the invention can be suitable for magnets that are not directly fastened among themselves although in the prior art the magnets require a cast or molded part that forms a support structure. The present invention therefore provides a solution which is suitable for any arrangement of magnets on the rotor.

The combination of the shapes of the magnets and the retention means of the magnets achieved only by a composite coating makes it possible to reduce losses in the rotor and therefore heating and minimize the risk of demagnetization of the magnets.

Therefore there can be two successive coatings contributing to the solidity of the rotor, i.e. one coating of the magnet structure also surrounds the unitary magnets and the second coating surrounds the assembly of the magnet structures.

Because the present invention uses a multitude of unitary magnets that replace a compact magnet of the prior art, the dissipation of heat is less and cover discs can be used as axial holding means, these discs advantageously replacing axial holding means between magnets and the rotor body, in some cases necessitating modifications of the magnets or of their coating to achieve fastening means that are complementary to the fastening means only the rotor. The size of cooling system can consequently be reduced.

The mesh structure is advantageously in the form of a honeycomb. A honeycomb mesh structure is known to increase the strength of an element, in the present case a magnet structure. The unitary magnets are inserted into advantageously hexagonal housings that ensure their retention. The walls of the housing provide electrical insulation and the density of housings in the magnet structure can be significantly increased. The honeycomb mesh structure can be made of a fiber-reinforced composite insulating material.

Each stator advantageously comprises concentric windings with a series of teeth with windings wound around each tooth, the teeth being fastened to one another.

The present invention accomplishes the reverse process of the process employed by many manufacturers of motors and electromagnetic generators. In the prior art, efforts at innovation were concentrated on the stators by designing increasingly complex windings that are difficult to implement.

On account of the design of an efficient rotor that contains no iron and is coated by the composite and contains magnet structures, each made up of a plurality of magnets, it has become possible to use concentric windings for the stator or stators, although a concentric winding of this type would not be entirely satisfactory with permanent magnets that are in one piece as used in the closest prior art.

It has been determined that the utilization of such an association of a composite rotor with the at least one iron stator comprising iron teeth or blocks and a concentric winding for the stator mounted on a winding support achieves synergy with regard to the power of the motor or of the generator used as well as the ease of fabrication and the mechanical strength of the motor or the generator. The same is true for a reduction of its heating.

Each winding advantageously rests on a tooth and at least partly surrounds a winding support, each winding support comprising or being associated with snap-fitting means that cooperate with complementary snap-fitting means carried by a tooth associated with the winding support so that the winding support is firmly connected with the associated tooth.

The technical effect achieved is an increased ease of assembly of the windings that takes even greater advantage of the use of a concentric winding for a motor or electromagnetic generator, which makes it possible to broaden their use. The snap-fitting is easy accomplished and makes possible a firm hold of the winding on the tooth, preventing an escape of the winding from an insertion on the tooth.

The winding support advantageously comprises an intermediate portion on which the winding is wound and a flat cover portion that is farthest from the associated tooth in the position in which the winding support is fastened to the tooth, being separated from the tooth by the winding and the intermediate portion, the flat cover portion having an external contour that covers at a distance at least one external contour facing the winding and abutting against the external perimeter of the winding, whereby the winding support can be a single piece or not.

It is the flat cover portion, by its external contour, that poses an obstacle to an escape of the winding from an insertion around the tooth. The intermediate portion can have grooves corresponding to the dimension of the electric wire to be wound for an easy winding of the coil.

The windings of the stators are advantageously concentric and/or connected to the exterior of the motor in a terminal strip, either in series or in parallel.

The median shaft advantageously carries a series of longitudinal grooves on the median shaft, locally on each portion of the median shaft, designed to receive respectively one of the two rotors, each rotor having a central cavity that has an inside diameter equal to the outside diameter of the median shaft with clearance that is just sufficient for an introduction of the median shaft into the central cavity, a contour of the central cavity having on its interior a complementary series of grooves that cooperate with the series of grooves on the median shaft to form mechanical means connecting the two rotors to the shaft, one groove of the complementary series being inserted between two grooves of the series on the median shaft.

The cavity can have grooves directly, in which case its internal contour is of essentially the same dimension as the external contour of the shaft, although it can also be that an intermediate piece in the interior of the cavity carries the grooves, in which case the internal contour of the cavity is larger than the exterior contour of the shaft, the internal contour of the part corresponding to the external contour of the shaft. What has been described above must be understood with a cavity and intermediate piece when one is present for the internal contour of the assembly consisting of the cavity and intermediate shaft.

The cooperation of series of grooves on the median shaft and the rotor that are inserted one between the other makes possible a precise radial angular positioning of the rotor. It is then possible to achieve an angular offset measured in a radial plane on the median shaft between two rotors, which contributes to reducing the detent torque.

The central cavity of the rotor is advantageously carried by a ring which is fastened to the associated rotor by removable fastening means, the cavity being elongated by or housing a grooved sleeve. The grooved sleeve provides a larger contact surface area with the grooves on the median shaft.

The motor advantageously integrates electronic control and power means on one longitudinal extremity of the housing, one of the two external circuits housed in a longitudinal external wall of the housing also providing cooling of the electronic control and power means.

The technical effect achieved by this preferred embodiment is to combine the cooling means of the motor or of the generator with the cooling means of the electronic control and power means, which represents an economy of means as well as a reduction of cost and requires less space for the assembly consisting of the motor and electronic means. The electronic control and power means are close to the motor and benefit from its cooling system via a cooling fluid circuit.

The housing can be axially extended by a hood which surrounds and protects the electronic control and power means of the motor. The housing and the hood form a closed assembly containing in its interior the two rotors, the four stators and the electronic control and power means.

BRIEF DESCRIPTION OF THE DRAWINGS

Other characteristics, purposes and advantages of the invention are described in greater detail below and with regard to the accompanying drawings which are provided by way of non-restrictive examples, and in which:

FIG. 3, FIGS. 4 and 4a are schematic representations of a lateral view of a common median shaft supporting two rotors that are part of the motor or of the generator according to one embodiment of the present invention, the rotors not being positioned on the shaft in FIG. 4a, FIGS. 5 and 5a are schematic representations of a view in perspective of a common median shaft supporting the motor or the generator in one embodiment according to the present invention, a portion of the common median shaft being shown on a larger scale in FIG. 5a to more clearly show an offset between two series of grooves intended to serve as mechanical fastening means of the respective rotor.

The figures are presented by way of example and are not restrictive of the invention. They constitute schematic representations intended to facilitate an understanding of the invention and are not necessarily drawings to scale of practical applications. In particular, the dimensions of the different pieces are not representative of reality.

In the following text, although all the figures illustrate a motor or generator with axial flux, the present invention also applies to a motor or a generator with radial flux.

The adjective "longitudinal" must be understood with reference to the median shaft 5 that traverses the rotors 2.

DETAILED DESCRIPTION OF THE INVENTIONS

Figure 2:
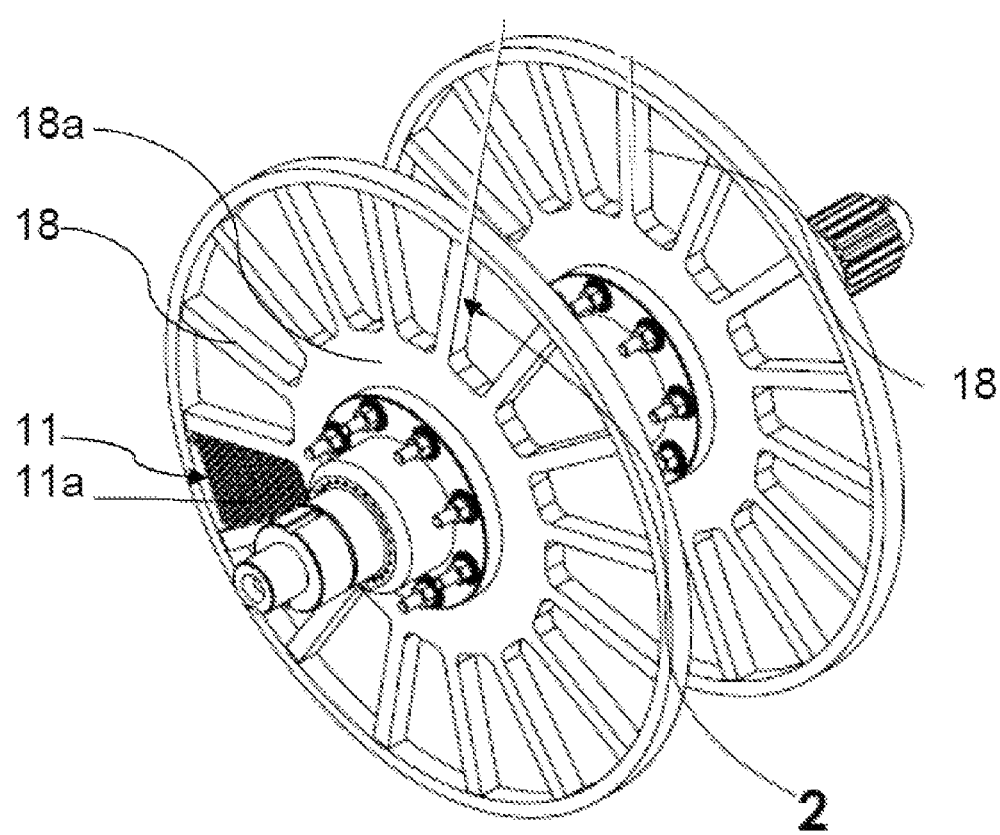
FIG. 2 is a schematic representation of a view in perspective of two rotors positioned on a common median shaft that is part of the motor or of the generator according to one embodiment of the present invention.
Figure 3:
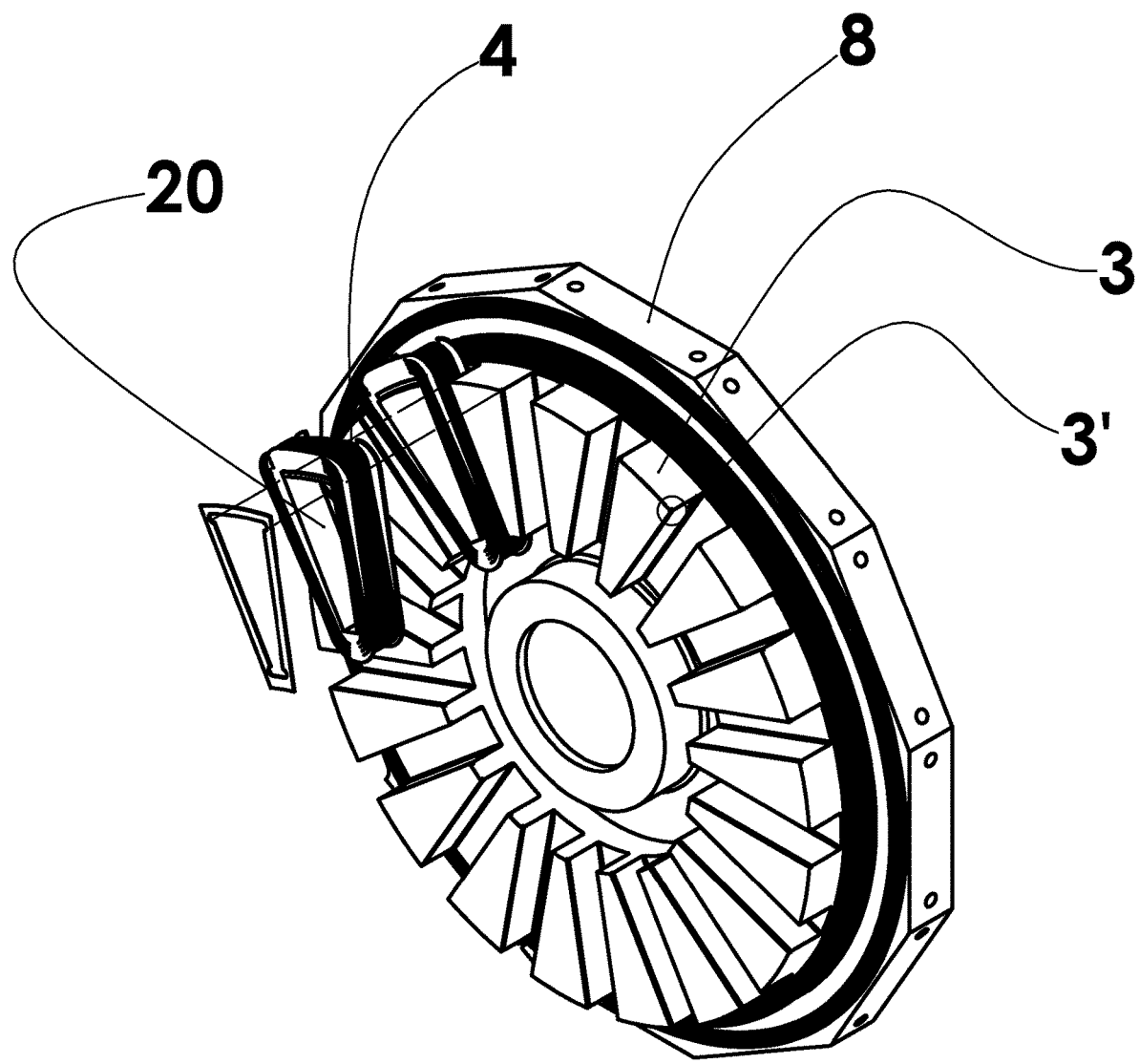
FIG. 3 is a schematic representation of a view in perspective of a stator comprising teeth and windings mounted on a respective tooth, the stator being part of motor according to one embodiment of the present invention and incorporating a winding support snap-fitted on the tooth, two winding supports being shown in this
Figure 4:
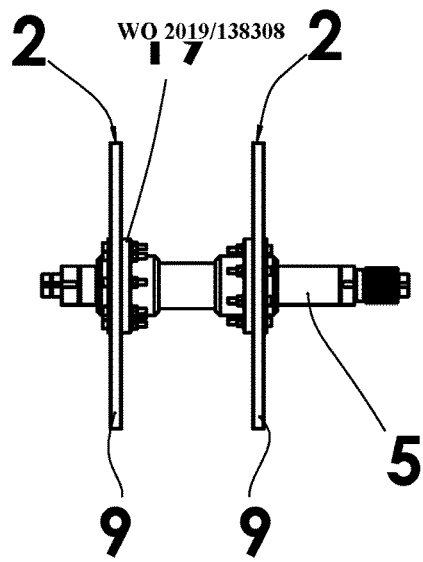
Figure 4A:
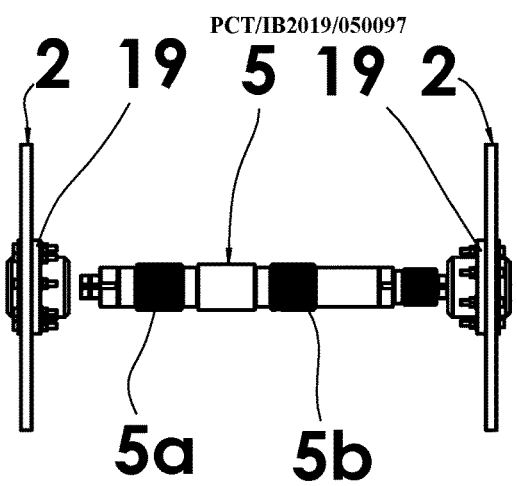

In FIG. 3, a single tooth 3 is identified by a reference number although the description relating to this single tooth 3 also applies to all the other teeth 3 of the stator 3, 8. In FIG. 2, a single unitary magnet 11a is identified by a reference number for a magnet structure 11, although the description relating to this single unitary magnet 11a also applies to all the unitary magnets of the rotor 2. Moreover, in FIG. 2, a single magnet structure 11 is shown. The same is true for the grooves 5a, 5b on the median shaft and the grooves 6 on the rotors.

Figure 1:
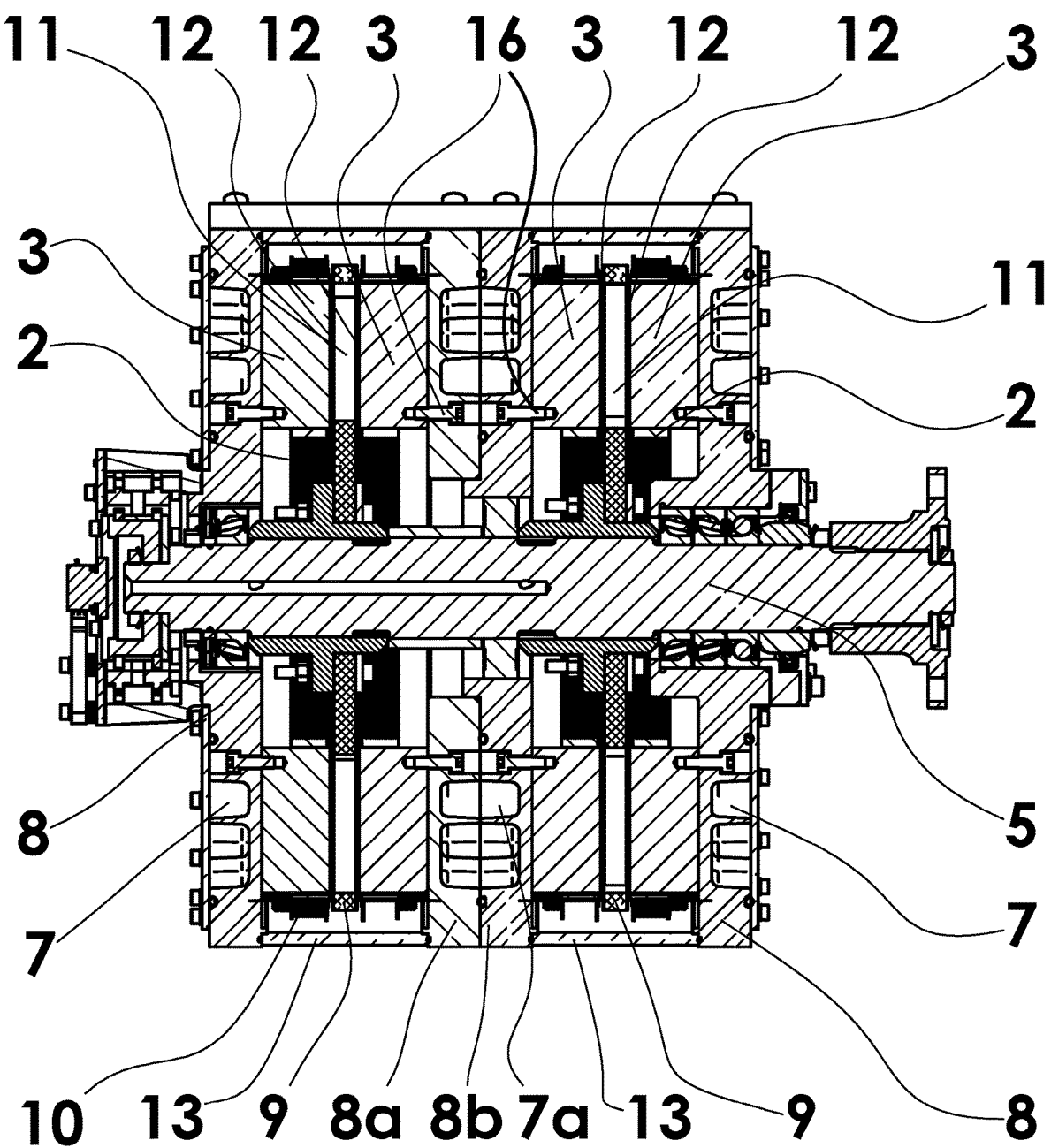
FIG. 1 is a schematic representation of a view in longitudinal section of one embodiment of the motor according to the present invention.

With reference to all the figures and FIG. 1 in particular, the present invention relates to a permanent-magnet synchronous electromagnetic motor or generator comprising at least two rotors 2 and at least four stators 3, 8 with a housing 8.

Each of the two rotors 2 comprises magnet structures 11 forming magnetic poles. The magnet structures 11 extend all the way around the at least one rotor 2 mounted so that it can rotate around a median shaft 5. Each of the four stators 3, 8 comprises windings 4.

The motor or the generator comprises a cooling system 7, 7a comprising three circuits of a cooling fluid, advantageously water or water-based, although this specification is not restrictive.

Two external circuits 7 are housed respectively in a longitudinal external wall of the housing 8 and are adjacent to an end stator 3, 8 to provide cooling of the associated end stator 3, 8.

The cooling system 7, 7a comprises an intermediate circuit 7a located between the two innermost stators 3, 8, the median shaft 5 being common to the two rotors 2, the two rotors 2 being connected to the median shaft 5 by mechanical means 5a, 5b, 6. The reference number 5a refers to the mechanical means of the common median shaft 5 associated with a first rotor having complementary mechanical means 6 and reference 5b refers to the mechanical means of the common median shaft 5 associated with the second rotor.

As shown in FIG. 1, the intermediate circuit 7a can be housed in an intermediate wall 8a, 8b of the housing 8 extending radially with respect to the common median shaft 5. This intermediate wall 8a, 8b contributes to the solidity of the housing 8 as well as to the housing of the intermediate circuit 7a of the cooling system 7, 7a, which is a dual function that achieves a saving of space and material.

Still with reference primarily to FIG. 1, the intermediate wall 8a, 8b can comprise two portions 8a, 8b extending radially with respect to the common median shaft 5. Each portion 8a, 8b can be fastened respectively to one of the two innermost stators 3, 8 on the motor by removable fastening means 16. These removable fastening means 16 are in the form of fastening screws in FIG. 1.

Reference number 13 indicates a ferrule that connects the longitudinal and exterior walls of the housing 8 to the intermediate wall 8a, 8b, a ferrule being provided on each side of the intermediate wall 8a, 8b. An air gap 12 exists between each stator 3, 8 and each rotor 2.

As shown in FIG. 2 for a single magnet structure 11, each magnet structure 11 can be composed of a plurality of unitary magnets 11a in place of a single large magnet.

The magnet structure 11 thus obtained can be in the form of a block with a rectangular or triangular cross-section.

To prevent an axial displacement of the magnet structures 11, cover discs 10 can be located axially on each of the two opposite axial faces of each rotor 2 covering the magnet structures 11. This measure advantageously replaces the axial mechanical retaining means 5a, 6 and is made possible by the reduction of the amount of heat released by each magnet structure 11 compared to the amount of heat released by a corresponding large magnet. It was not unusual for the cover discs 10 to burn when used with large magnets, which is no longer the case with the unitary magnets 11a described in this preferential embodiment of the present invention.

The cover discs 10 can be made of composite material. The magnet structures 11 can be coated in an external composite coating layer defining the external contour of each of the rotors 2. In two possible alternatives, the cover discs 10 can be coated in the external composite coating layer or located on a respective axial face of the external coating layer.

A binding band 9 can surround the external coating layer on this external periphery farthest from the median shaft 5. The rotor 2 can therefore have a peripheral external ring forming its edge, the binding band 9 being located on a peripheral external ring making it possible to retain the unitary magnets 11a and the magnet structures 11 against a centrifugal force.

The unitary magnets 11a can be constituted by elementary magnet blocks, which are advantageously hexagonal, with a mesh structure, the unitary magnets 11a being bonded by a resin that separates them or can each be inserted into a respective housing defined by one of the meshes of the mesh structure.

Each block 11a has an elongated form penetrating lengthwise into its associated housing extending along the thickness of the magnet structure 11. Without being restrictive, the elongated block can be cylindrical or in the form of a polyhedron with at least one flat longitudinal face.

The mesh structure can be in the form of a honeycomb. In this case, when this at least one mesh structure is in the form of a honeycomb, each block can have a longitudinal face with a hexagonal shape.

In FIG. 2, the rotor 2 comprises branches 18 separating the adjacent magnet structures 11. The branches 18 can extend radially starting from the hub 18a forming the central part of the rotor 2. This arrangement is not restrictive and the separation between the magnet structures can be realized only by the external composite coating layer.

With reference to FIG. 3 in particular, each stator 3, 8 comprises concentric windings 4 and a series of teeth 3 with windings 4 wound around each tooth, the teeth 3 being fastened to one another.

As illustrated in this FIG. 3 in particular, each winding 4 can rest on the tooth 3 while surrounding at least partly a winding support 14. Each winding support 14 can comprise or be associated with snap-fitting means 15' on a part 15 that cooperates with complementary snap-fitting means 3' on a tooth 3 associated with the winding support 14 so that the winding support 14 is fastened to the associated tooth. This requires that at least a portion of the winding support 14 is inserted around the tooth 3.

The snap fitting can be made directly between the winding support 14 at the tooth 3, in which case each winding support 14 carries snap-fitting means 15', or between an intermediate piece 15 fastened to the winding support 14 and the tooth 3, in which case each winding support 14 is associated with snap-fitting means 15' that the winding support 14 does not have. This latter case is illustrated in FIG. 3.

As can be seen in particular in FIG. 3, the winding support 14 can comprise an intermediate portion 21 on which the winding 4 is wound. The winding support 14 can comprise a flat cover portion 20, which is advantageously dished, which is located farther from the associated tooth 3 in the fastening position of the winding support 14 on the tooth 3, being separated from the tooth 3 by the winding 4 and the intermediate portion 21.

The flat cover portion 20 can have an external contour that covers at a distance at least one external contour facing the winding 4 and abutting against the external contour of the winding, whereby the winding support 14 can be in one piece or not. The cover portion 20 can abut an end of the winding 4 around the tooth 3 and around the intermediate portion 21.

"At a distance" means that the flat cover portion 20 is not in contact against the face of the tooth 3 facing the winding 4 and "cover" means that the flat cover portion 20 conceals the surface of the tooth 3 facing the winding 4 when viewed head on. "Covering at least" means that the surface area of the flat cover portion 20 can be greater than the surface area of the tooth 3 facing the winding 4. There can be an empty space in the cover portion.

In FIG. 3, the snap fitting is accomplished by an intermediate piece 15 fastened to the winding support 14. This intermediate piece 15 has snap-fitting shapes 15' that cooperate with a respective groove 3' as a complementary snap-fitting shape on the edges of the facing surface of the associated tooth 3.

The windings 4 of the stators 3, 8 can advantageously be concentric and can be connected to the exterior of the motor in a terminal strip, either in series or in parallel.

As shown more particularly in FIGS. 4, 4a, 5, 5a and 6, as mechanical fastening means 5a, 5b, 6 of each rotor 2 on the median shaft 5, the median shaft 5 can have a series of longitudinal grooves 5a, 5b on the median shaft 5 locally on each portion of the median shaft 5 intended to receive respectively one of the two rotors 2.

A contour of a cavity 22 of the rotor 2 has a series of grooves 6, which either has the series of grooves 6 directly or has an interior part that has the series of grooves 6. These mechanical means 5a, 5b, 6 make possible a high degree of precision for the angular positioning in a radial plane of the rotors 2 fastened to the retaining shaft.

Figure 5:
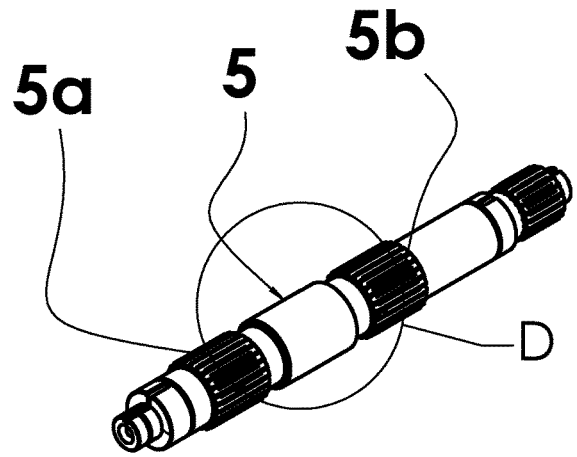
Figure 5A:
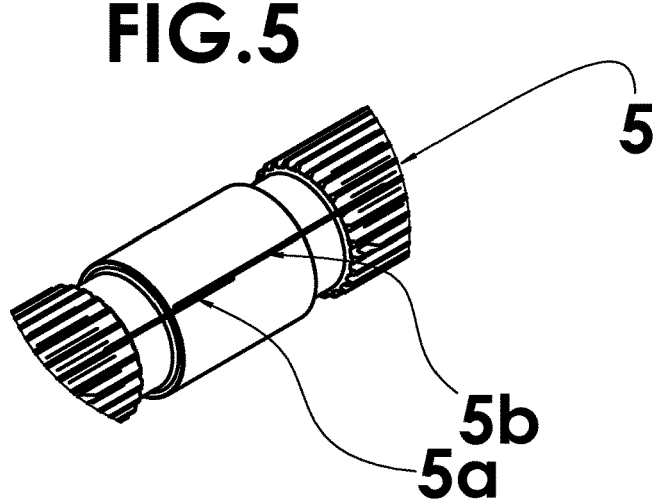

Therefore, as shown in FIGS. 5 and 5a viewed in combination with FIG. 2, the magnet structures 11 on one of the two rotors 2 can be radially offset by a predetermined angle with respect to the magnet structures 11 on the other rotor 2, the mechanical means 5a, 5b, 6 being capable of precisely adjusting the offset of the magnet structures 11 of one rotor 2 with respect to the other rotor 2.

Figure 6:
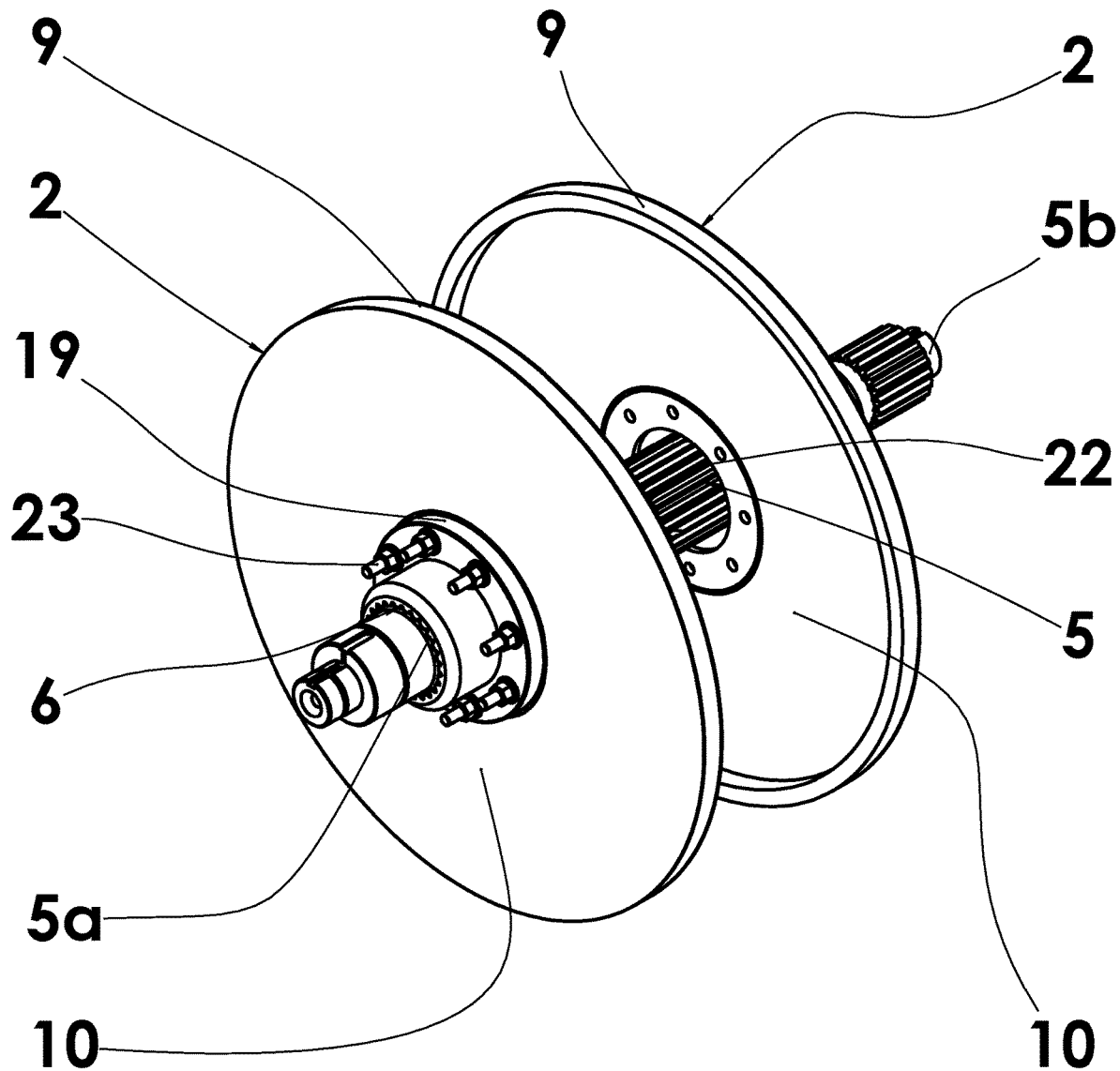
FIG. 6 is a schematic representation of a view in perspective of two rotors positioned on a common median shaft which is part of the motor or generator in accordance with one embodiment of the present invention, this figure showing in particular the complementary mechanical fastening means of a rotor on the common median shaft.

As shown more particularly in FIG. 6, each rotor 2 can have a central cavity 22 which has an inside diameter, measured directly or with a spacer part 14 housed in the cavity 22 reducing its inside diameter, that equals the outside diameter of the median shaft 5 with a clearance that is just sufficient for the introduction of the median shaft 5 into the central cavity 22 with or without the spacer part 14.

One edge of the central cavity 22 or of the spacer part 14 inserted into the cavity 22 can have on its internal periphery, as the second part, mechanical means 5a, 5b, 6 that are complementary to the first part, a series of grooves 6 that are complementary to the series of grooves 5a, 5b on the median shaft 5 and can cooperate with one another to form the mechanical means 5a, 5b, 6 connecting the two rotors 2 to the shaft.

In the installed position of the rotor 2, a groove 6 of the complementary series can be inserted between two grooves of the series on the median shaft 5 and vice-versa.

As illustrated in FIG. 5a, which is an enlarged detail of FIG. 5, a groove 5a of the first series of grooves of the median shaft 5 associated with a first rotor 2 is not aligned with a groove 5b of the second series of grooves of the median shaft associated with a second rotor. This can be seen by extending the two grooves 5a and 5b toward one another as indicated in FIG. 5a.

As shown in particular in FIG. 6, the central cavity 22 is surrounded by or comprises a part in the form of a ring 19 which is fastened to the associated rotor 2 by removable fastening means 23. The cavity 22 can be extended by or house a grooved sleeve 14 fastened to the ring 19, whereby the sleeve can be one piece with the rim 19 or can be a separate part removably fastened to the ring 19.

As a result of the presence of this grooved sleeve 14 between the edge of the cavity 22 and the median shaft 5, the inside diameter of the assembly formed by the cavity 22 and the grooved sleeve 14 is reduced and is essentially equivalent to the outside diameter of the median shaft 5.

Although not shown in the figures and with reference to FIG. 1 for the elements shown in FIG. 1 and included in this embodiment, the motor can integrate electronic control and power means on one longitudinal extremity of the housing 8.

One of the two external circuits 7 housed in a longitudinal external wall of the housing 8, located on the side of the motor where the electronic control means are advantageously housed in a casing that is continuous with the housing 8 of the motor or in the extension of the housing 8, can then also provide cooling of the electronic control and power means in addition to providing the cooling of an end stator 3, 8.

The invention claimed is:

1. A permanent-magnet synchronous electromagnetic motor with axial flux comprising
two rotors (2) and four stators (3, 8) with a housing (8),
the rotors (2) comprising magnet structures (11) forming magnetic poles, the magnet structures (11) extending all around each rotor (2) mounted so that it can rotate around a median shaft (5), and
the four stators (3, 8) comprising windings (4),
the motor comprising a cooling system (7, 7a) comprising three circuits (7, 7a) of a cooling fluid, with two external circuits (7) housed respectively in a longitudinal external wall of the housing (8), and being adjacent to an end stator (3, 8) to perform a cooling of the associated end stator (3, 8) and an intermediate circuit (7a) located between the two innermost stators (3, 8) on the motor simultaneously performing a cooling of the two innermost stators (3, 8), the median shaft (5) being common to the two rotors (2), the two rotors (2) being connected to the median shaft (5) by mechanical means (5a, 5b, 6) characterized in that each magnet structure (11) is composed of a plurality of unitary magnets (11a), cover discs (10) of the magnet structures (11) being located axially on each of two opposite axial faces of each rotor (2), the cover discs (10) being made of composite material, the magnet structures (11) being coated in a composite external coating layer defining the exterior contour of each of the rotors (2), the cover discs (10) being coated in the external composite coating layer or placed on a respective axial face of the external coating layer.

2. The motor of claim 1, in which the intermediate circuit (7a) is housed in an intermediate wall (8a, 8b) of the housing (8) extending radially with respect to the common median shaft (5).

3. The motor of claim 2, in which the intermediate wall (8a, 8b) comprises two portions (8a, 8b) extending radially with respect to the common median shaft (5), each portion (8a, 8b) being fastened respectively to one of the innermost two stators (3, 8) on the motor by removable fastening means (16).

4. The motor of claim 1, in which the magnet structures (11) on one of the two rotors (2) are radiantly offset by a predetermined angle with reference to the magnet structures (11) on the other rotor (2), the mechanical means (5a, 5b, 6)) being capable of precisely adjusting the offset of the magnet structures (11) of one rotor (2) with respect to the other rotor (2) during the installation of the rotors on the median shaft (5).

5. The motor of claim 1, in which a binding band (9) surrounds the external coating layer on its external periphery farthest from the median shaft (5).

6. The motor of claim 1, in which the unitary magnets (11a) are constituted by elementary magnet blocks with a mesh structure, the unitary magnets (11a) being bonded by a resin separating them or each inserted into a respective housing defined by one of the meshes of the mesh structure.

7. The motor of claim 6, in which the mesh structure is in the form of a honeycomb.

8. The motor of claim 1, in which each stator (3, 8) comprises concentric windings (4) and a series of teeth (3) with windings (4) wound around each tooth, the teeth (3) being fastened to one another.

9. The motor of claim 8, in which each winding (4) rests on the tooth (3) surrounding at least partly a winding support (14), each winding support (14) comprising or being associated with snap fitting means (15') cooperating with complementary snap fitting means (3') on a tooth (3) associated with the winding support (14) so that the winding support (14) is fastened with the associated tooth (3).

10. The motor of claim 9, in which the winding support (14) comprises an intermediate portion (21) on which the winding (4) is wound and a flat cover portion (20) which is farther from the associated tooth (3) in the fastening position of the winding support (14) on the tooth (3), being separated from the tooth (3) by the winding (4) and the intermediate portion (21), the flat cover portion (20) having an external contour axially covering at a distance at least one external turn facing the winding (4) and abutting against the external contour of the winding, whereby the winding support (14) can be a single piece or not.

11. The motor of claim 8, in which the windings (4) of the stators (3, 8) are concentric and are connected to the exterior of the motor in a terminal strip, either in series or in parallel.

12. The motor of claim 1, in which the median shaft (5) has a series of grooves (5a, 5b) longitudinal to the median shaft (5) locally on each portion of the median shaft (5) designed to receive respectively one of the two rotors (2), each rotor (2) having a central cavity (22) having an inside diameter that equals the outside diameter of the median shaft (5) with a clearance just sufficient for the introduction of the median shaft (5) into the central cavity (22), the interior of the central cavity (22) having a complementary series of grooves (16) cooperating with the series of grooves (5a, 5b) on the median shaft (5) to form mechanical means (5a, 5b, 6) connecting the two rotors (2) to the shaft, a groove (6) of the complementary series being inserted between two grooves (5a, 5b) of the series on the median shaft (5).

13. The motor of claim 12, in which the central cavity (22) of the rotor (2) is on a ring (19) fastened to the associated rotor (2) by removable fastening means (23), the cavity (22) being extended by or housing a grooved sleeve (14).

14. The motor of claim 1, which integrates electronic control and power means on one longitudinal external wall of the housing (8), one of the two external circuits (7) housed in a longitudinal external wall of the housing (8) also providing cooling of the electronic control and power means.

* * * * *